(12) United States Patent
Cavalca et al.

(10) Patent No.: US 7,555,389 B2
(45) Date of Patent: Jun. 30, 2009

(54) CREATING AN ABSORPTION PARAMETER MODEL

(75) Inventors: Maud Cavalca, Redhill (GB); Robin Fletcher, Guildford (GB); Alfonso Gonzalez, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/764,083

(22) Filed: Jun. 15, 2007

(65) Prior Publication Data

US 2008/0312838 A1   Dec. 18, 2008

(51) Int. Cl.
*G01V 1/40* (2006.01)
(52) U.S. Cl. .............................. 702/6; 702/11; 702/14; 702/16; 367/45; 367/46; 367/47; 367/68; 367/73
(58) Field of Classification Search ...................... 702/6, 702/11, 14, 16; 367/45–47, 68, 73
See application file for complete search history.

(56) References Cited

U.S. PATENT DOCUMENTS

| 5,479,376 | A | * | 12/1995 | Gonzalez et al. | ............... | 367/47 |
| 6,954,402 | B2 | * | 10/2005 | Brygynevych | ............... | 367/25 |
| 7,382,683 | B1 | * | 6/2008 | Ferber et al. | ................. | 367/30 |
| 2002/0180732 | A1 | | 12/2002 | Docherty | | |
| 2006/0265132 | A1 | | 11/2006 | Rickett | | |

FOREIGN PATENT DOCUMENTS

WO   WO 2006/025824   3/2006

OTHER PUBLICATIONS

Bachrach et a., "Two approaches fro Q estimation and its application to seismic inversion," *SEG/New Orleans 2006 Annual Meeting*, pp. 2971-2975, 2006.
Brzostowski and McMechan, "3-D tomographic imaging of near-surface seismic velocity and attenuation," *Geophys.*, 57(3):396-403, 1992.
Dasgupta and Clark, "Estimation of Q from surface seismic reflection data," *Geophysics*, 63(6):2120-2128, 1998.
Deal *et al.*, "Turning ray amplitude inversion: mitigating amplitude attenuation due to shallow gas," *SEG Int'l Exposition Annual Meeting*, Salt Lake City, Utah, Oct. 6-11, 2002.
Gonzalez and Chambers, "Compensating seismic amplitude for transmission losses in the overburden," *SEG Expanded Abstracts*, pp. 1501-1504, 1994.
Guerra and Leaney, "Q(z) model building using walkaway VSP data," *Geophysics*, 71(5):V127-V132, 2006.
Hackert and Parra, "Improving Q estimates from seismic reflection data using well-log-based localized spectral correction," *Geophysics*, 69(6):1521-1529, 2004.

(Continued)

*Primary Examiner*—Tung S Lau
*Assistant Examiner*—Sujoy K Kundu
(74) *Attorney, Agent, or Firm*—Dan C. Hu; Liangang(Mark) Ye; Jeffrey E. Griffin

(57) ABSTRACT

To generate an absorption parameter model, estimated values of an effective absorption parameter are received, where the estimated effective absorption parameter values represent absorption encountered by a seismic wave in a subterranean structure. Based on the estimated effective absorption parameter values, an absorption parameter model is generated that varies absorption parameter values along at least one dimension of the subterranean structure.

11 Claims, 5 Drawing Sheets

OTHER PUBLICATIONS

Hicks and Pratt, "Reflection waveform inversion using local descent methods: Estimating attenuation and velocity over a gas-sand deposit," *Geophysics*, 66(2):598-612, 2001.

Lancaster and Tanis, "High density 3D press-stack Q estimation," *EAGE Expanded Abstracts —66th Annual Conference and Exhibition*, PP. 1-4, 2004.

Liu and Wei, "Interval Q inversion from CMP gathers: Part I —absorption equation,"*SEG Annual Meeting*, pp. 1717-1720, Houston, Texas 2005.

Maresh *et al.*, "Seismic attenuation of Atlantic margin basalts: Observations and modeling," *Geophysics*, 71(6):B211-B221, 2006.

Plessix, "Estimation of velocity and attenuation coefficient maps from crosswell seismic data," *Geophysics*, 71(6):S235-S240, 2006.

Quan and Harris, "Seismic attenuation tomography using the frequency shift method," *Geophys.*, 62(3):895-905, 1997.

Ribodetti and Vireux, "Asymptotic theory for imaging the attenuation factor Q," *Geophysics*, 63(5):1767-1778, 1998.

Tonn, "The determination of the seismic quality factor Q from VSP data: A comparison of different computational methods," *Geophysical Prospecting*, 39(1):1-27. 1991.

Vasco *et al.*, "A simultaneous inversion of seismic traveltimes and amplitudes for velocity and attenuation," *Geophysics*, 61(6):1738-1757, 1996.

Watanabe and Sassa, "Seismic attenuation tomography by use of amplitude attenuation and pulse broadening," *SEG Expanded Abstracts*, pp. 33-36, 1993.

Zhang and Ulrych, "Estimation of quality factors from CMP records," *Geophys.*, 67(5):1542-1547, 2002.

International search Report, dated Oct. 15, 2008 for Application Number PCT/US2008/065690 filed Jun. 3, 2008.

\* cited by examiner

CREATING AN ABSORPTION PARAMETER MODEL

TECHNICAL FIELD

The invention relates generally to creating absorption parameter models, such as a model representing interval-Q factors or spatial two-dimensional or three-dimensional Q models, based on a technique that includes decomposing an absorption term into discrete absorption parameter factors along a ray path.

BACKGROUND

Seismic surveying is used for identifying subterranean elements, such as hydrocarbon reservoirs, fresh water aquifers, gas injection reservoirs, and so forth. In performing seismic surveying, seismic sources are placed at various locations on an earth surface, sea floor or at a sea surface (or in a wellbore), with the seismic sources activated to generate seismic waves directed into a subterranean structure. Examples of seismic sources include explosives, air guns, or other sources that generate seismic waves.

The seismic waves generated by a seismic source travel into the subterranean structure, with a portion of the seismic waves reflected back to the surface (earth surface, sea floor, sea surface, or wellbore surface) for receipt by seismic sensors (e.g., geophones). These seismic sensors produce signals that represent detected seismic waves. Signals from the seismic sensors are processed to yield information about the content and characteristic of the subterranean structure.

As seismic waves travel through a subterranean structure, the seismic waves are subject to dissipation or absorption. The dissipation (absorption) effect induced by a subterranean structure can be represented by an absorption parameter Q, referred to as a seismic quality factor.

Reliable Q models are required to perform seismic processing applications that use inverse-Q filtering or integrated-Q migration, as examples. Various conventional techniques exist for developing Q models. However, such conventional techniques are associated with various drawbacks and/or limitations.

SUMMARY

In general, according to an embodiment, the method includes receiving estimated values of an effective absorption parameter that represents the global absorption that a seismic wave has encountered while traveling in a subterranean structure. Based on the estimated values of the effective absorption parameter, an absorption parameter model is generated that varies absorption parameter values along at least one dimension of the subterranean structure.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
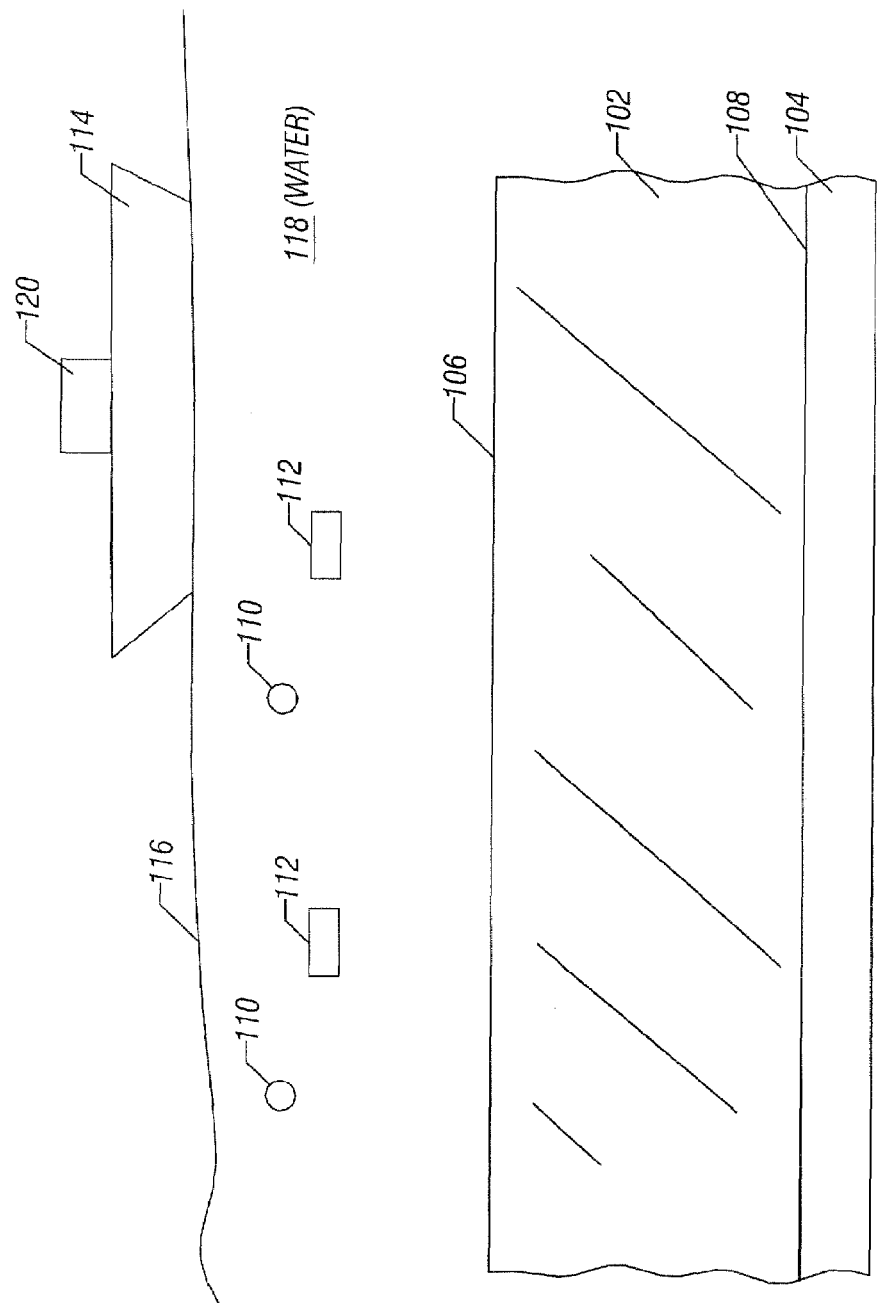
FIG. 1 is a schematic view of a marine seismic surveying arrangement in which some embodiments of the invention can be employed.

FIG. 1 illustrates an example marine seismic surveying environment. In FIG. 1, the subterranean structure includes subterranean layers 102 and 104 underneath a sea floor (or seabed) 106. In some examples, the subterranean layer 102 can include an earth formation, while the subterranean layer 104 can include a hydrocarbon layer, a water layer, or some other layer of interest. An interface 108 between the subterranean layers 102, 104 is a subsurface reflector that reflects seismic waves.

FIG. 1 also shows a number of seismic sources 110 and seismic sensors 112 in the body of water 118. The seismic sources 110 and seismic sensors 112 can be towed by a sea vessel 114 at the sea surface 116. For example, the seismic sources 110 and seismic sensors 112 can be attached to support cables (not shown) that are connected to the sea vessel 114. A seismic source 110 creates seismic waves in the body of water 118, and a portion of the seismic waves travels downwardly through the body of water 118 and into the subterranean layer 102. Some portion of the seismic waves is reflected upwardly by the interface 108 between the subterranean layers 102, 104. The reflected seismic waves can be received by the seismic sensors 112, which produce measured seismic data to be processed. The measured seismic data can be in the form of a seismogram, a seismic trace, or in some other format.

If a computer 120 is provided on the sea vessel 114, then the computer 120 can be used to process the seismic data produced by the seismic sensors 112.

Alternatively, the data recorded by the seismic sensors 112 can be processed later when the sea vessel 114 returns to land. In yet another alternative, the sea vessel 114 can communicate (such as by wireless communication) the measured seismic data to a remote computer for processing at the remote computer.

In other implementations, the seismic sources 110 and seismic sensors 112 can be located on the sea floor 106, instead of being towed by the sea vessel 114. In a land surveying context, the seismic sources 110 and seismic sensors 112 are provided on the earth surface. In a borehole surveying context, the seismic sources 110 and/or seismic sensors 112 are positioned in the borehole.

Both a source seismic wave and a reflected seismic wave are subject to absorption (dissipation) effects caused by the subterranean structure through which the seismic wave propagates. The absorption effect is represented by an absorption parameter, referred to as absorption Q (also referred to as a seismic quality factor). To compensate for absorption effects in a subterranean structure or to accurately represent the absorption effects, it is desirable that an accurate Q model be built. According to some embodiments, the following types of Q models can be built: a model of interval-Q values (also referred to as an "interval-Q model"), a spatial two-dimensional (2D) Q model, and spatial a three-dimensional (3D) Q model. A Q model that includes multiple interval-Q values is used for a subterranean structure that is represented as a vertical stack of layers, where each interval-Q value is the estimated Q for a respective layer (interval). Thus, in the interval-Q model, the estimated Qs vary along a first direction (the depth or z direction) in the subterranean structure. In the orientation of FIG. 1, the depth or z direction is the vertical direction. Note that the interval-Q model is a one-dimensional (1D) Q model.

A 2D Q model has estimated Q values that vary in both the depth (z) direction as well as one lateral direction (x or y direction) that is orthogonal to the depth direction. A 3D Q model has estimated Q values that vary in the depth (z) direction as well as two orthogonal lateral directions (x and y directions) that are also orthogonal to the depth direction.

The effective seismic quality factor $Q_{eff}$ depends on the ray path of the seismic wave, and as such can be referred to as $Q_{eff}(t)$ (i.e. as a function of travel time t), for a given source/receiver pair. Another parameter that represents absorption effects is R(t), which is the ratio of the travel time (t) to the effective quality factor $Q_{eff}(t)$; in other words:

$$R = \frac{t}{Q_{eff}(t)}. \qquad (Eq.\ 1)$$

It is noted that either Q, $Q_{eff}$ or R can be generally referred to as an "absorption parameter."

Eq. 2 below defines an amplitude transfer function (also referred to as an absorption operator), A(f), of a seismic wave, where the amplitude transfer function is dependent upon both seismic wave frequency (f) and parameter R(t):

$$A(f) = \exp(-\pi f R(t)). \qquad (Eq.\ 2)$$

The amplitude transfer function defines how the absorption effects of the subterranean structure reduce amplitudes of seismic waves at different frequencies f. According to some embodiments, it is assumed that intrinsic attenuation (i.e. attenuation induced by absorption) varies linearly with frequency, in that the quality factor, Q, is assumed to be frequency-independent in the bandwidth of interest.

Using any of various conventional techniques, an effective Q, referred to as $Q_{eff}(t)$, can be estimated, where $Q_{eff}(t)$ is an effective-Q factor that represents the absorption effects that a seismic wave has encountered during the seismic wave's propagation in the subterranean structure. Although $Q_{eff}(t)$ is a useful mathematical quantity, it is not a medium property, contrary to interval-Q values, Q(x,z) values of a 2D Q model, or Q(x,y,z) values of a 3D Q model. Note that $Q_{eff}(t)$ represents an average of the absorption effects experienced by the seismic wave along the propagation path (from seismic source to subterranean reflector, and from subterranean reflector to seismic receiver, as an example) through the subterranean structure. On the other hand, interval-Q values, Q(x,z) values, and Q(x,y,z) values vary with one or more dimensions in the subterranean structure.

For each $Q_{eff}(t)$, the respective R(t) is computed according to Eq. 1.

In accordance with some embodiments, a technique is used for converting the effective-Q factor $Q_{eff}(t)$ into a medium property Q model (either an interval-Q model, a 2D Q model, or a 3D Q model). To perform such conversion, an absorption term (derived based on the effective-Q factor) is decomposed into discrete Q factors along a ray path that is traveled by the seismic wave in the subterranean structure.

Although just one effective-Q factor, $Q_{eff}(t)$, is depicted, note that there typically would be multiple $Q_{eff}(t)$ values for multiple source/receiver (S, R) pairs. The $Q_{eff}(t)$ values can be derived from any effective-Q estimation technique in which attenuation due to reflection coefficients does not appear in the effective-Q estimates. Example techniques include the following: (1) dense estimation of effective-Q values from monochromatic smoothed Log Spectral Ratio (LSR) estimates, as described in Lancaster et al., "High-Density 3D Pre-Stack Q Estimation," (2004); (2) LSR techniques that involve derivation of effective-Q values from the slopes of the LSR curves as a function of frequencies; (3) effective-Q estimation techniques based on a frequency-shift analysis; and so forth.

For different source/receiver pairs (S, R), the ray path will be different and the travel time (t) can be different. Thus, for each (S, R) and each time t, an estimated $Q_{eff}(t)$ is provided. Note that $Q_{eff}(t)$ and R(t) for the different source/receiver pairs can alternatively be written as $Q_{eff}(S,R,t)$ and R(S,R,t).

Absorption parameters R(t) are computed from respective $Q_{eff}(t)$, or $Q_{eff}(S,R,t)$, values. Each R(t) parameter is represented as "surface consistent" absorption terms, with one of the surface consistent absorption terms decomposed into respective discrete Q values along a respective ray path. To perform the decomposition, the absorption operator, A(f) is forced to be surface consistent. Amplitudes of seismic waves can be decomposed into a surface consistent model of the earth, usually by decomposition into source, receiver, offset, and geology (CMP or common midpoint) components. Decomposing A(f) thus is performed as follows:

$$A(f) = A_a \cdot A_s \cdot A_r \cdot A_o \cdot A_i, \qquad (Eq.\ 3)$$

which means that the absorption can be assigned to a multiplicative average absorption effect, $A_a$, followed by residual absorption effects assigned to a source $A_s$, receiver $A_r$, offset $A_o$, and CMP $A_i$ of the actual data traces.

According to the relationships defined by Eqs. 2 and 3, each absorption parameter R(t) can be expressed as follows:

$$R(t) = R_a(t) + R_s(t) + R_r(t) + R_o(t) + R_i(t), \qquad (Eq.\ 4)$$

where $R_a(t)$ represents an average absorption effect, where $R_s(t)$, $R_r(t)$, $R_o(t)$, $R_i(t)$ represent residual absorption effects assigned respectively to the source, receiver, offset and CMP (common midpoint)

The "midpoint" for a seismic data trace is a point generally close to midway between the seismic source location and the receiver location of the trace. A "trace" refers to the seismic energy recorded by each seismic receiver during data acquisition. A "common midpoint" is the midpoint that is common to multiple source/receiver pairs. In other words, different traces corresponding to different source/receiver pairs may share a midpoint (the common midpoint) on the surface that, for each trace, is midway between the source and the receiver.

The technique used by some embodiments for converting effective Q-factors, $Q_{eff}(t)$, to a 1D, 2D, or 3D Q model is referred to as a surface consistent Q tomography (SCQT) technique. Starting from effective-Q estimates, a map of the medium property Q (interval-Q model, 2D Q model, or 3D Q model) is derived. The value $R_i(t)$, which is the component of R(t) assigned to the CMP, is decomposed into discrete Q factors along the trajectory of the rays in the ray path, according to the following equation:

$$R_i(t) = \sum_{(j,k,l)}^{ray} \Delta T_{jkl} Q_{jkl}^{-1}, \quad \text{(Eq. 5)}$$

where $Q_{jkl}^{-1}$ represents the inverse Q-factor element for each respective cell (j, k, l) crossed by the ray associated with $R_i(t)$, and $\Delta T_{jkl}$ are the travel times components of the ray in each of these cells.

Eq. 5 above is expressed for Q-factor elements in three dimensions that are represented by a three-dimensional array of cells. Each cell is represented as cell (j, k, l), where some of the cells are crossed by respective rays associated with $R_i(t)$. Eq. 5 is easily modified for developing a 2D Q model, and can be expressed as follows:

$$R_i(t) = \sum_{(j,l)}^{ray} \Delta T_{jl} Q_{jl}^{-1}, \quad \text{(Eq. 6)}$$

where $Q_{jl}^{-1}$ represents the inverse Q-factor element for each cell (j, l) crossed by the ray associated with $R_i(t)$, and $\Delta T_{jl}$ represents the travel time of the corresponding component of the ray in each corresponding cell.

Figure 2:
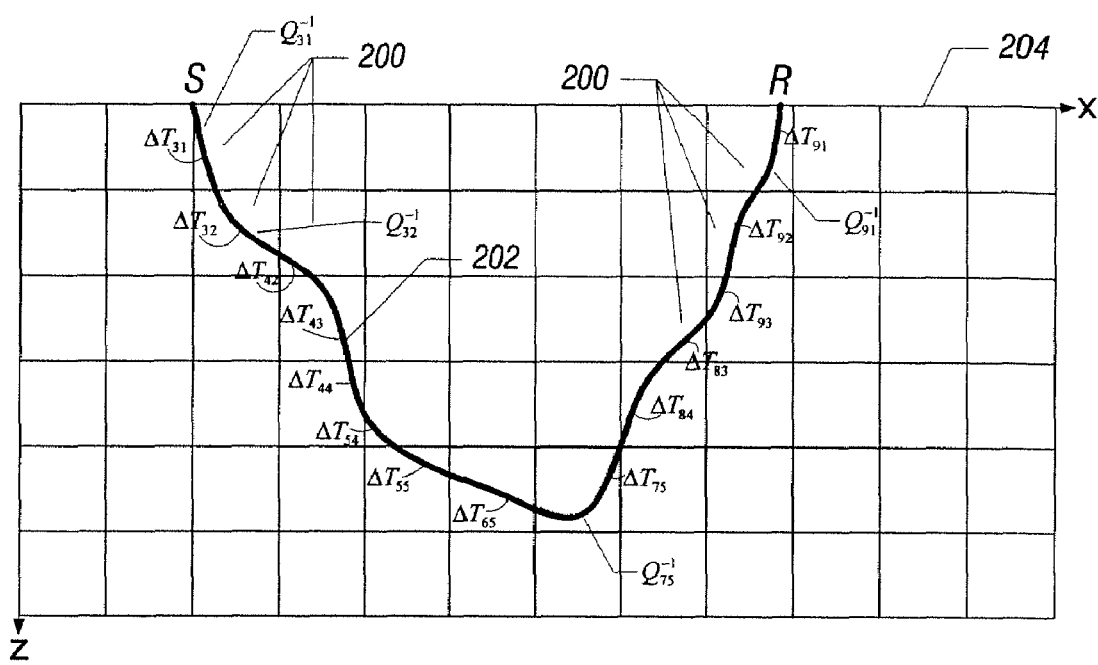
FIG. 2 illustrates discrete inverse Q factors and corresponding times associated with ray path segments in an array of cells, according to an embodiment.

FIG. 2 depicts a 2D arrangement of cells and a ray path 202 that traverses through some of the cells. The cells traversed by the ray path are identified by 200. The remaining cells are not traversed by the ray path. Note that the ray path 202 starts at a seismic source (S) and ends at a seismic receiver (R), both located at a surface 204 (representing a level at which the source and receiver are located, whether in water, on the sea floor, or on land). FIG. 2 depicts the ray path 202 for one source/receiver pair, (S, R). Note here that the seismic wave along the ray path 202 starts propagating from the source (S) in a generally downwardly direction, and is reflected by a subterranean reflector in a generally upwardly direction to the receiver (R). The ray path 202 is made up of multiple ray segments in corresponding cells (j, l) of the array of cells.

The total travel time (t) corresponds to the travel time of the seismic wave along the ray path 202. The total travel time, t, is decomposed into corresponding $\Delta T_{jl}$ components that represent travel time of the seismic wave in cell (j, l). For a different source/receiver pair, a different ray path would be provided, with possibly a different travel time t.

As depicted in FIG. 2, $R_i(t)$ is decomposed into 2D-gridded $Q_{jl}^{-1}$ elements along the ray path 202 associated with the source/receiver pair depicted in FIG. 2. Each of the $Q_{jl}^{-1}$ elements is weighted (according to Eq. 6) by the partial travel time, $\Delta T_{jl}$, of the seismic wave in each corresponding cell 200 through which the ray path crosses.

The respective Q models can then be determined by solving the linear Equation $$d = Hm, \quad \text{(Eq. 7)}$$

where d is the input vector of the ratio of travel time to effective-Q values, R(t), preliminarily estimated for plural source/receiver pairs, m is the vector of the surface consistent absorption components ($R_a$, $R_s$, $R_r$, $R_o$, N) together with the $Q_{jkl}^{-1}$ factors or $Q_{jl}^{-1}$ factors, and H is the surface consistent Q tomography operator according to Eqs. 4 and 5 or 6. In other words, H contains the $\Delta T_{jkl}$ or $\Delta T_{jl}$ values. The unknowns in m ($Q^{-1}$ values and $R_a$, $R_s$, $R_r$, $R_o$, N) can be solved for by any standard matrix inversion algorithm, such as the Gauss-Seidel iterative algorithm.

In one example, it is assumed that there are n input R(S,R,t) values, each one associated with a source/receiver pair (S,R) and a travel time t; in other words, each input value is associated with a different ray path. It is assumed that these n input values involve $n_S$ sources, $n_R$ receivers and $n_O$ different offsets, and that it is desired to solve a 2D Q-model composed of $n_x \times n_z$ cells ($n_x$ cells in x direction and $n_z$ cells in z direction). Then in Eq. 7, d is a vector of dimension n:

$$d = \begin{pmatrix} R^{(1)} \\ \ldots \\ R^{(i)} \\ \ldots \\ R^{(n)} \end{pmatrix},$$

where i=1, . . . , n refers to the different input values (i.e. the different ray paths), H is a matrix of dimension $n \times (n_x \times n_z + 1 + n_S + n_R + n_O)$ (n rows and $n_x \times n_z + 1 + n_S + n_R + n_O$ columns), and where each component $H_{ij}$ is set to either 0 or 1 if it is associated with a surface consistent term and is set to either 0 or $\Delta T_{kl}^{(i)}$ elsewhere. In other words, for a component $H_{ij}$ of the matrix H associated with the $Q_{kl}^{-1}$ factor, $H_{ij}$ is set to 0 if the associated ray path i does not cross cell (k,l); however, the component $H_{ij}$ is equal to $\Delta T_{kl}^{(i)}$ if the ray path i crosses cell (k,l). Moreover, m is the vector of unknowns, of dimension $n_x \times n_z + 1 + n_S + n_R + n_O$ (which equals the number of cells in the 2D Q-model plus the number of surface consistent components), where m is expressed as:

$$m = \begin{pmatrix} R_a \\ R_{S_1} \\ \ldots \\ R_{S_{n_S}} \\ R_{R_1} \\ \ldots \\ R_{R_{n_R}} \\ R_{O_1} \\ \ldots \\ R_{O_{n_O}} \\ Q_{11}^{-1} \\ Q_{12}^{-1} \\ \ldots \\ Q_{n_z n_x}^{-1} \end{pmatrix}.$$

Figure 3:
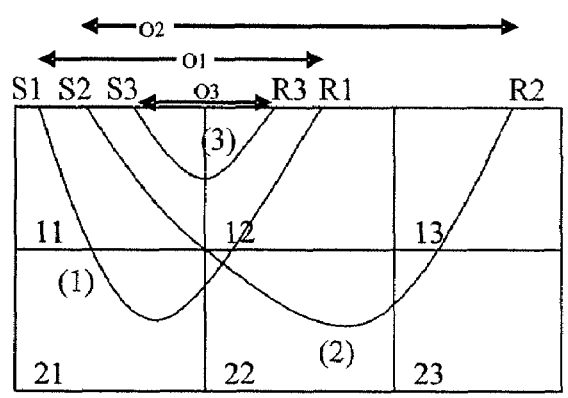
FIG. 3 illustrates a basic example array of cells and ray paths associated with different source/receiver pairs extending through the cells.

FIG. 3 shows a basic example array of cells that is 3×2 ($n_x=3$, $n_z=2$) in dimension. Three source/receiver pairs are depicted, with ray paths (1), (2), and (3). The cells are labeled 11, 12, 13, 21, 22, and 23. For this example configuration, Eq. 7 is expressed as:

$$\underbrace{\begin{pmatrix} R^{(1)} \\ R^{(2)} \\ R^{(3)} \end{pmatrix}}_{d} =$$

$$\underbrace{\begin{pmatrix} 1 & 1 & 0 & 0 & 1 & 0 & 0 & 1 & 0 & 0 & \Delta T_{11}^{(1)} & \Delta T_{12}^{(1)} & 0 & \Delta T_{21}^{(1)} & \Delta T_{22}^{(1)} & 0 \\ 1 & 0 & 1 & 0 & 0 & 1 & 0 & 0 & 1 & 0 & \Delta T_{11}^{(2)} & 0 & \Delta T_{13}^{(2)} & 0 & \Delta T_{22}^{(2)} & \Delta T_{23}^{(2)} \\ 1 & 0 & 0 & 1 & 0 & 0 & 1 & 0 & 0 & 1 & \Delta T_{11}^{(3)} & \Delta T_{12}^{(3)} & 0 & 0 & 0 & 0 \end{pmatrix}}_{H} \underbrace{\begin{pmatrix} R_a \\ R_{S1} \\ R_{S2} \\ R_{S3} \\ R_{R1} \\ R_{R2} \\ R_{R3} \\ R_{O1} \\ R_{O2} \\ R_{O3} \\ Q_{11}^{-1} \\ Q_{12}^{-1} \\ Q_{13}^{-1} \\ Q_{21}^{-1} \\ Q_{22}^{-1} \\ Q_{23}^{-1} \end{pmatrix}}_{m}$$

Note that this example is purely illustrative. In reality a given source (or receiver or offset or $Q^{-1}$ factor) may be associated with many different input data.

For each input data observation (observed seismic wave), an estimation of the ray path is performed to estimate the $\Delta T_{jkl}$ or $\Delta T_{jl}$ values (included in matrix H). Also, it is determined which cells of the Q model are crossed by the ray path. This can be achieved by employing an appropriate ray tracing method (from analytical expressions using straight rays in very simple media to refined two-point ray tracing algorithm in complex media). It is assumed that a velocity model has been determined independently before the application of the SCQT technique so that the velocity of a seismic wave from the velocity model can be used to estimate the time for the seismic wave to travel through each particular cell along the estimated ray path.

The output of the SCQT technique provides a medium property Q model as well as an estimation of the other surface consistent absorption components (expressed in Eq. 4). For absorption compensation any of these components can be recombined and introduced in an inverse-Q filtering algorithm. An inverse-Q filtering algorithm is used to compensate for absorption effects of the subterranean structure. Furthermore, the medium property Q-model developed using the SCQT technique can be used in Q-migration or for rock physics interpretation. Q-migration refers to improving or correcting seismic data to account for misplacement of subterranean reflectors due to structural dip, discontinuities, and curvature of formations.

The SCQT technique discussed above is for generating a 2D or 3D Q model. However, a more simplified SCQT technique can be used for deriving an interval-Q model. While Eq. 5 can be straightforwardly simplified using interval-Q values ($Q_n$) for each layer, n, and can be solved as previously described by some ray tracing algorithm, an explicit simplification can be introduced by approximating each ray path as a crooked ray path. To perform the explicit simplification, a simplified expression for the CMP absorption term, $R_i(t)$, can be derived that no longer involves any ray tracing but that is expressed as a function of zero-offset features.

Figure 4:
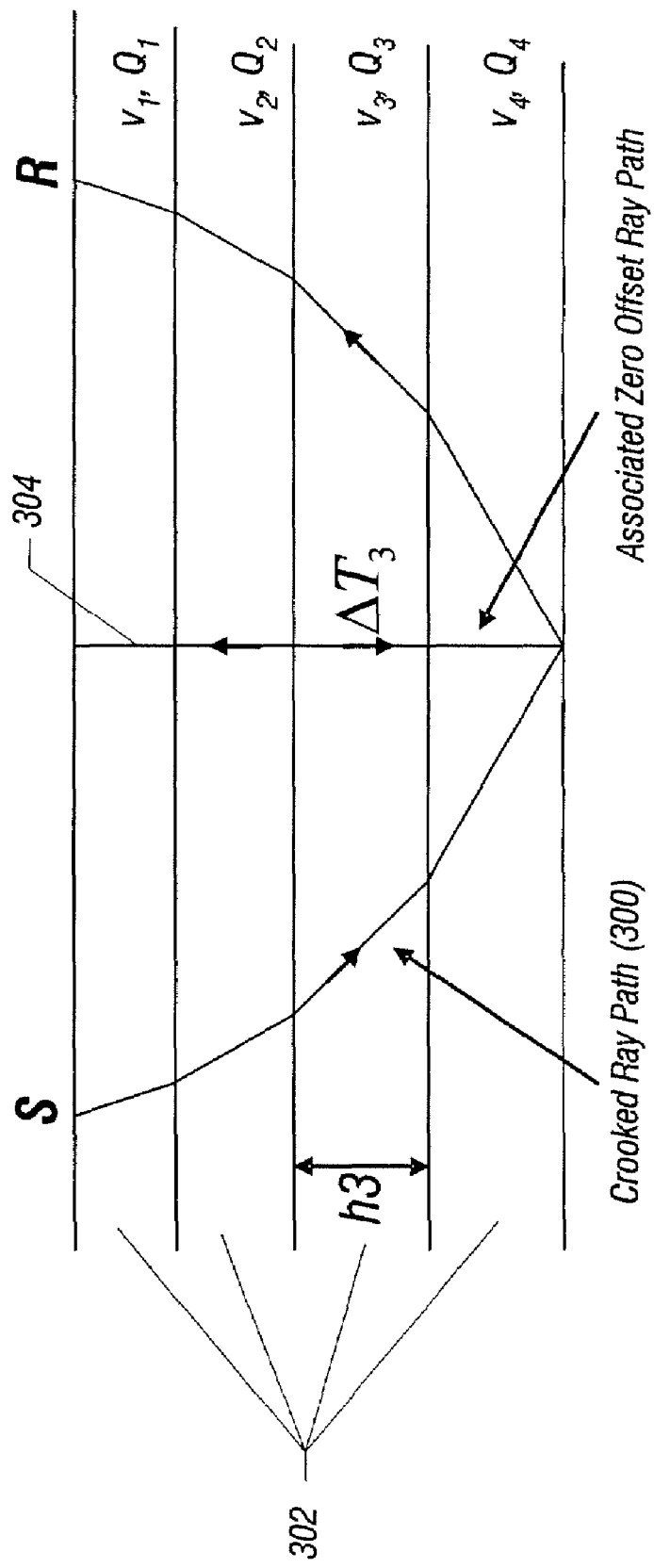
FIG. 4 illustrates a crooked ray path in a stack of intervals, according to an embodiment.

For this simplification, the ray path is assumed to be a "crooked ray path," depicted as 300 in FIG. 4. The crooked ray path extends through layers (intervals) 302 making up the subterranean structure. The crooked ray path 300 includes a succession of ray segments, where each ray segment is a straight ray in the corresponding layer 302. FIG. 4 also shows the associated zero-offset ray path 304. "Zero offset" means that the distance between the source and receiver is zero (the source and receiver are located at the same position), which means that the zero-offset ray path 304 simply extends in the vertical direction (z direction).

By applying Snell's law at each interface of the layers, where Snell's law provides a relationship between the direction of the ray segments and the layer velocities, it can be shown that the absorption represented by $R_i(t)$ along the crooked ray path can be approximated by:

$$R_i(t) = \sum_{n=1}^{N} \Delta T_n Q_n^{-1} + (t-T) \left( \sum_{n=1}^{N} v_n^2 \Delta T_n \right)^{-1} \sum_{n=1}^{N} v_n^2 \Delta T_n Q_n^{-1}, \quad \text{(Eq. 8)}$$

$$\Delta T_n = \frac{2h_n}{v_n}$$

where T is the total travel time of the associated zero-offset ray path 304, $\Delta T_n$ is the partial travel time (in each layer n) of this zero-offset ray path, $v_n$ is the layer velocity for the respective layer, and $h_n$ is the layer thickness for each layer 302.

Interval-Q values (or more specifically $Q_n^{-1}$) can be inverted in a surface consistent manner, as previously described, by combining Eqs. 4 and 8. The $\Delta T_n$ values at zero offset (which provide the content of the matrix H) are straightforwardly calculated from the known 1D velocity model. The 1D velocity model expresses velocity of a wave as a function of depth in the subterranean structure. Thus, in each interval, $\Delta T_n$ is equal to twice the height ($2h_n$) of the interval (since the seismic wave passes through the interval twice, once when propagating from the source to the subterranean reflector, and once when reflected from the subterranean reflector to the receiver) divided by the seismic wave velocity $v_n$ through the interval (as provided by the velocity model).

Figure 5:
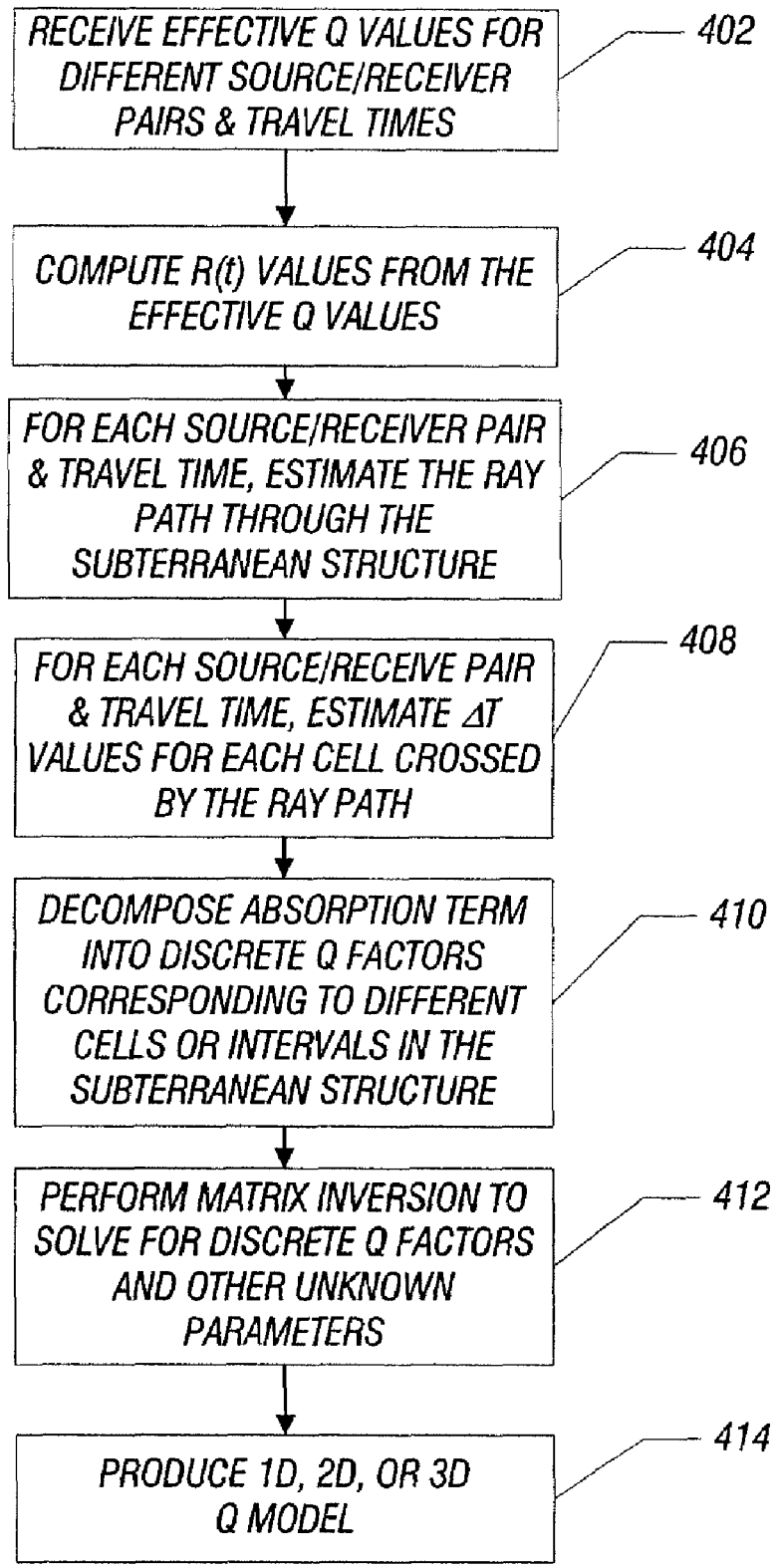
FIG. 5 is a flow diagram of a process of developing a Q model, according to an embodiment.

FIG. 5 is a flow diagram of a process of producing a medium property Q model, in accordance with some embodiments. The process of FIG. 5 is performed by analysis software that can be executed on the computer, for example. The analysis software receives (at 402) effective Q values, $Q_{eff}(t)$, for different source/receiver pairs and different travel times t. As discussed above, the $Q_{eff}(t)$ values can be derived using an effective-Q estimation technique. Next, based on the $Q_{eff}(t)$ values, corresponding R(t) values for the different $Q_{eff}(t)$ values are computed (at 404).

Next, for each source/receive pair and each travel time, the ray path through the subterranean structure is estimated (at 406). As discussed above, for producing 2D or 3D Q models, the ray path can be determined by using a ray tracing technique. However, to develop a 1D Q model (interval-Q model), a simplification can be assumed where the ray path is transformed into a zero-offset ray path (e.g., 304 in FIG. 4) that extends in the z direction.

Next, for each source/receiver pair and each travel time, the $\Delta T_{jkl}$, $\Delta T_{jl}$, $\Delta T_n$ values (for 3D, 2D, or 1D Q models, respectively) are estimated (at 408). In other words, the estimated time for the seismic wave to travel through a respective cell is computed.

A term for the absorption effect (at the common midpoint in some embodiments) is decomposed (at 410) into discrete Q factors corresponding to different cells or intervals in the subterranean structure. This decomposition is illustrated by Eqs. 5, 6, and 8 (for the 3D, 2D, and 1D scenarios, respectively). The discrete Q factors for the different cells or intervals are unknown at this time.

Next, matrix inversion is performed (at 412) to solve for discrete Q factors identified at 410, according to Eq. 7 above. The matrix inversion also solves for the other unknown parameters, including the components $R_a(t)$, $R_s(t)$, $R_r(t)$, $R_o(t)$ that have been decomposed from R(t) according to Eq. 4.

From the solved discrete Q factors, a 1D, 2D, or 3D Q model is produced (at 414). The Q model can then be used for various applications, such as inverse filtering, Q-migration, or rock physics interpretation, as examples.

Figure 6:
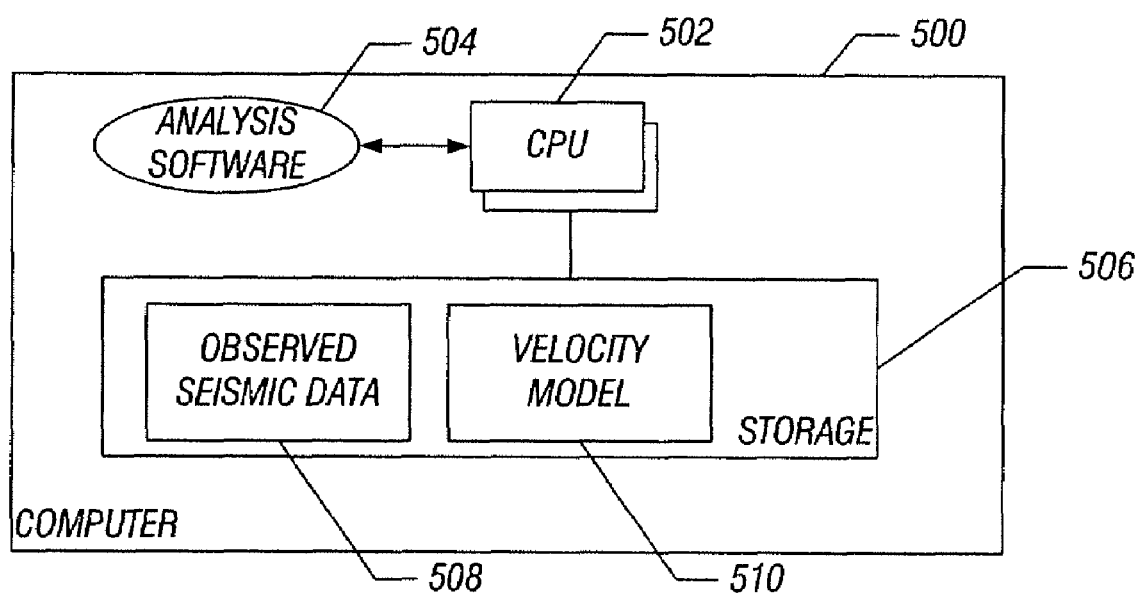
FIG. 6 is a computer in which analysis software for performing the process of FIG. 5 is executable.

The analysis software that can be used for performing the process of FIG. 5 is depicted as analysis software 504 in FIG. 6. The analysis software 504 is executable on one or more central processing units CPU(s) 502 in the computer 500. The CPU(s) 502 is (are) connected to a storage 506, which stores observed seismic data 508 (seismic data gathered in the field in a seismic survey) and velocity model 510. The observed seismic data 508 can be used for deriving the effective Q factors, $Q_{eff}(t)$. The velocity model 510 is used for computing the $\Delta T_{jkl}$, $\Delta T_{jl}$, $\Delta T_n$ values discussed above.

Instructions of the analysis software 504 can be loaded for execution on a processor (such as one or more CPUs 502). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method executed by a computer, comprising:
receiving estimated values of an effective absorption parameter, wherein the estimated effective absorption parameter values represent absorption encountered by a seismic wave in a subterranean structure;
based on the estimated effective absorption parameter values, generating an absorption parameter model that varies absorption parameter values along at least one dimension of the subterranean structure,
wherein generating the absorption parameter model uses a technique that decomposes a term representing an absorption effect of the subterranean structure into discrete absorption factors along a ray path of the seismic wave, wherein the absorption parameter model contains the discrete absorption factors; and
computing values for the discrete absorption factors,
wherein the discrete absorption factors are for corresponding cells crossed by the ray path, wherein computing the values for the discrete absorption factors for corresponding cells crossed by the ray path comprises computing the values for the discrete absorption factors for corresponding intervals stacked in a depth direction, wherein the computed values for the discrete absorption factors are interval-Q values.

2. The method of claim 1, further comprising forcing an amplitude transfer function representing seismic wave amplitude attenuation to be surface consistent by representing the effective absorption parameter with plural surface consistent absorption components, wherein one of the surface consistent absorption components is the term that is decomposed into the discrete absorption factors.

3. The method of claim 2, wherein decomposing the term into the discrete absorption factors comprises decomposing a surface consistent absorption component assigned to a common midpoint into the discrete absorption factors.

4. The method of claim 2, wherein representing the effective absorption parameter with plural surface consistent absorption components comprises representing an R(t) parameter with the plural surface consistent absorption components.

5. The method of claim 1, further comprising:
computing travel times of a seismic wave along the ray path through respective cells of the absorption parameter model; and using the travel times to solve for the discrete absorption factors.

6. An article comprising at least one computer-readable storage medium containing instructions for deriving an absorption parameter model having plural cells, wherein the instructions when executed cause a computer to:
receive estimated values of an effective absorption parameter, wherein the estimated effective absorption parameter values represent absorption of a seismic wave in a subterranean structure;
identify ray paths passing through the cells of the absorption parameter model, wherein the ray paths represent propagation paths traveled by seismic waves associated with corresponding source/receiver pairs;
estimate travel times of respective seismic waves through the cells; and
based on the estimated travel times, compute discrete absorption factors for the absorption parameter model that varies absorption parameter values along at least one dimension of the subterranean structure;
wherein the ray paths are transformed into zero-offset ray paths, and wherein the absorption parameter model is an interval Q model.

7. An article comprising at least one computer-readable storage medium containing instructions for deriving an absorption parameter model having plural cell, wherein the instructions when executed cause a computer to:
receive estimated values of an effective absorption parameter, wherein the estimated effective absorption parameter values represent absorption of a seismic wave in a subterranean structure;
identify ray paths passing through the cells of the absorption parameter model, wherein the ray paths represent propagation paths traveled by seismic waves associated with corresponding source/receiver pairs;
estimate travel times of respective seismic waves through the cells; and
based on the estimated travel times, compute discrete absorption factors for the absorption parameter model that varies absorption parameter values along at least one dimension of the subterranean structure;
wherein the estimated effective absorption parameter values comprise effective Q values that represent averages of effects of the subterranean structure on a seismic wave propagated through the subterranean structure.

8. The article of claim 7, wherein the instructions when executed cause the computer to further:
represent the effective absorption parameter as surface consistent absorption terms; and
decompose one of the surface consistent absorption terms into the discrete absorption factors.

9. The article of claim 8, wherein the surface consistent absorption term that is decomposed is a term assigned to a common midpoint of the source/receiver pairs.

10. A computer comprising:
a storage to store estimated values of an effective absorption parameter, wherein the estimated effective absorption parameter values represent absorption of a seismic wave in a subterranean structure; and
a processor to:
based on the estimated effective absorption parameter values, generate an absorption parameter model that varies absorption parameter values along at least one dimension of the subterranean structure,
wherein the absorption parameter model is generated using a technique that decomposes a term representing an absorption effect of the subterranean structure into discrete absorption factors along a ray path of the seismic wave, wherein the absorption parameter model contains the discrete absorption factors; and
compute values for the discrete absorption factors,
wherein the discrete absorption factors are for corresponding cells crossed by the ray path, wherein computing the values for the discrete absorption factors for corresponding cells crossed by the ray path comprises computing the value for the discrete absorption factors for corresponding intervals stacked in a depth direction, wherein the computed values for the discrete absorption factors are interval-Q values.

11. The computer of claim 10, wherein the processor is to further:
compute travel times of the seismic wave along the ray path through respective cells of the absorption parameter model; and
use the travel times to solve for the discrete absorption factors.

* * * * *